United States Patent
Brotz

[11] Patent Number: 5,684,616
[45] Date of Patent: *Nov. 4, 1997

[54] MOVING MIRROR APPARATUS

[76] Inventor: Gregory R. Brotz, P. O. Box 1322, Sheboygan, Wis. 53081

[*] Notice: The term of this patent shall not extend beyond the expiration date of Pat. No. 5,455,706.

[21] Appl. No.: 534,377

[22] Filed: Sep. 28, 1995

Related U.S. Application Data

[63] Continuation-in-part of Ser. No. 767,503, Sep. 30, 1991, Pat. No. 5,455,706, which is a continuation-in-part of Ser. No. 454,389, Dec. 21, 1989, Pat. No. 5,072,215, which is a continuation-in-part of Ser. No. 182,920, Apr. 18, 1988, Pat. No. 4,896,150.

[51] Int. Cl.⁶ .............. G02B 26/08; H01F 1/00; H01L 39/12
[52] U.S. Cl. .............. 359/198; 359/223; 359/225; 359/872; 335/216; 505/166
[58] Field of Search .............. 359/198, 199, 359/223, 225, 872, 875; 335/216, 285, 287; 505/166, 181, 848

[56] References Cited

U.S. PATENT DOCUMENTS

| | | | |
|---|---|---|---|
| 4,892,863 | 1/1990 | Agarwala | 505/1 |
| 5,099,216 | 3/1992 | Pelrine | 335/220 |
| 5,559,384 | 9/1996 | Boland et al. | 505/166 |

Primary Examiner—Paul M. Dzierzynski
Assistant Examiner—Darren E. Schuberg
Attorney, Agent, or Firm—William Nitkin

[57] ABSTRACT

A moving mirror apparatus for scanning a light beam, such apparatus having a mirror associated with a support member able to be repulsed by a superconductor, the mirror/support member being suspended above a superconductive material with a plurality of field coils positioned around the periphery of the support member, each of the field coils being independently operable to attract the support member to cause quick, frictionless movement of the mirror to reflect the light beam to different positions, depending upon which of the field coils is activated, by attraction of the support member to the activated field coil overcoming the repulsion of the superconductive material. The apparatus can be contained within a transparent vacuum chamber in certain embodiments and can in other embodiments have independent beam movement in conjunction with the reflection of the beam by the mirror.

12 Claims, 3 Drawing Sheets

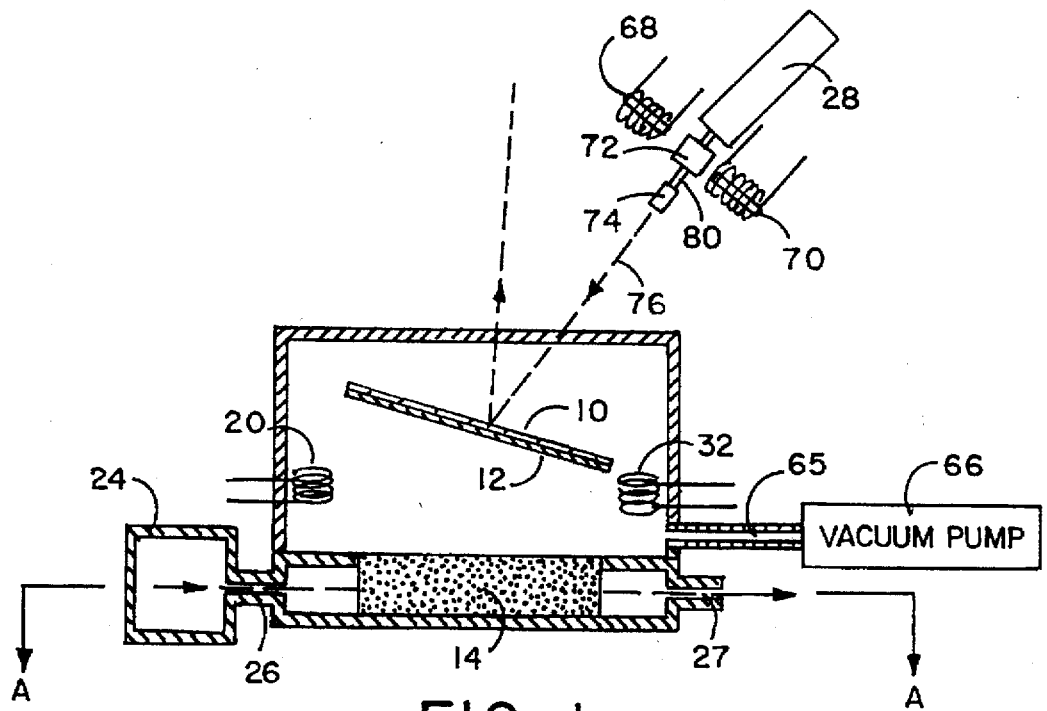
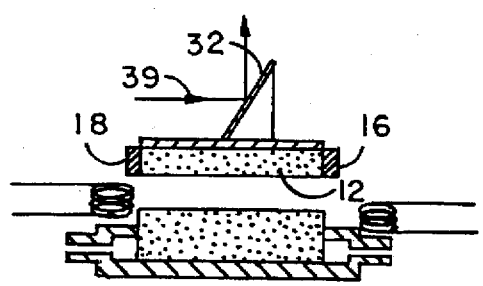
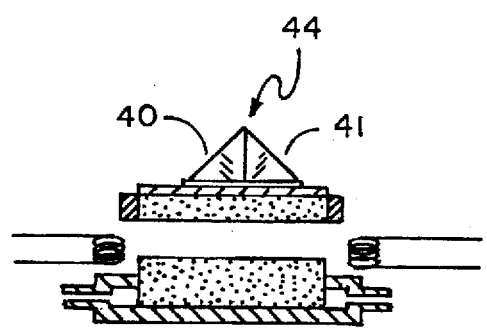
FIG. 1
FIG. 2
FIG. 3

MOVING MIRROR APPARATUS

This application is a continuation-in-part of my previous application for a Mirror-moving System, Ser. No. 07/767,503 filed Sep. 30, 1991 now U.S. Pat. No. 5,455,706, which was a continuation-in-part of my previous application for a Three-Dimensional Imaging System, Ser. No. 454,389 filed Dec. 21, 1989, now U.S. Pat. No. 5,072,215 which was a continuation-in-part of my previous application for Three-Dimensional Imaging System, Ser. No. 182,920 filed Apr. 18, 1988, now U.S. Pat. No. 4,896,150.

BACKGROUND OF THE INVENTION

1. Field of the Invention

The system of this invention resides in the field of devices to move mirrors and more particularly relates to a mirror levitated above a superconductive material with the directional movement of such mirror controlled by electronic means.

2. Description of the Prior Art

Mirrors are utilized in the prior art to direct light, including laser beams and the like, to various points. Applicant's U.S. Pat. No. 4,896,150 discloses the high-speed moving of scanning mirrors which reflect laser beams to a plurality of points within a viewing chamber to illuminate particles in specific areas to form a visible image. The mechanical movement of mirrors in a desired direction has been traditionally accomplished by using motors such as stepper motors or solenoids and the like. Movement of mirrors by a gimbal structure can also be accomplished, but such devices require much uneven torsional force to overcome the straight mass movement of the gimbal structure. Such structures would be difficult to move at very high speeds because torsional forces would be uneven depending on where a gimballed structure was directed. Such problems in the prior art relate to the slowness of such mechanical or electromechanical mirror movement devices which, because of their physical structure including their large mass, cannot quickly change the mirror's position and direction of movement. When producing three-dimensional images, as described in the aforementioned patent, for example, the mirror-scanning movement must be accomplished at an extremely high speed.

SUMMARY OF THE INVENTION

It is an object of this invention to provide a mirror-moving system which changes a mirror's position and direction of movement extremely quickly without the need for mechanical or electromechanical movement devices. It is a further goal of this invention to provide a mirror-moving system which is lightweight, of low mass and which creates no friction between the parts involved in such mirror's movement. When reflecting a beam of light such as from a laser, the mirror used in this invention is mounted on, or is incorporated into, a wafer of magnetic material that is levitated above a superconductive material which levitation is due to the Meissner effect. When the magnetic field surrounding the magnetic wafer intersects a pure superconductor that is cooled to below its critical temperature, the magnetic field induces eddy currents in the skin of the superconductor. The magnetic fields associated with the eddy currents oppose the applied magnetic field in accordance with Faraday's law of induction and Lenz's law. Consequently, the magnetic wafer and the superconductor repel each other. The magnetic flux from the magnetic wafer cannot penetrate more than a small distance into the superconductor because of the eddy currents. The mirror mounted on such magnetic wafer also includes a peripheral element (s) which can be attracted by field coils thereunder which coils are sequentially activated and wherein the operation and sequencing of such field coil activation is electronically controlled, and is thus virtually instantaneous, to provide for controlled, frictionless, and extremely fast mirror movement as the coils in turn attract the peripheral element downward against the repelling force of the superconductor. An evacuated transparent chamber can be provided to eliminate air resistance and prevent dust contamination and condensation which factors might otherwise slow the movement of the mirror.

Also disclosed is an embodiment which, in addition to utilizing the mirror movement to direct the beam, has controlled means to move the beam which movement will increase the speed of scanning as described further below.

BRIEF DESCRIPTION OF THE DRAWINGS

FIG. 1 illustrates a cross-sectional view through a mirror levitated above a superconductive material with coils under the mirror periphery within a transparent, non-magnetic, evacuated vacuum chamber and with beam movement means.

FIG. 2 illustrates a mirror mounted at an angle on its support means and levitated above a superconductive material.

FIG. 3 illustrates a mirror having multiple faces levitated above a superconductive material.

DESCRIPTION OF THE PREFERRED EMBODIMENT(S)

Figure 4:
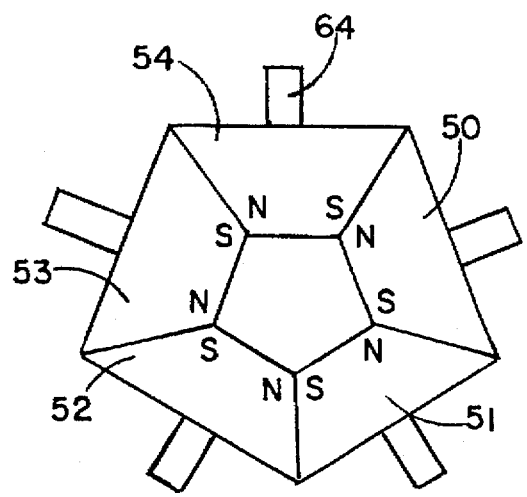
FIG. 4 illustrates a top view of a plurality of interattracted magnetic support members in an array.

A thin mirror 10 which can move on an infinite number of different axes to different positions is seen in cross-section in FIG. 1 positioned on a support member 12 which can be a thin wafer of magnetic material which is repulsed and levitated above, superconductive material 14, the temperature of which has been sufficiently lowered to make superconductive material 14 a superconductor. The low-weight structure of this invention can be further contained within a transparent, non-magnetically interactive, evacuated chamber 120 having a vacuum therein drawn through vacuum line 65 by vacuum pump 66. The lack of air eliminates any air resistance to mirror movement. Such a chamber can be made of glass and can be, in one embodiment, spherical. Since such chamber is transparent, it would not interfere with any light beam passing therethrough. With the use of such chamber problems with condensation of water vapor as frost are avoided, and the tendency of the mirror's reflective surface to oxidize is eliminated which occurrence would otherwise lower the mirror's efficiency as a reflector. In some instances magnetic support member 12 can have its upper surface highly polished to also act as the mirror. The lower the weight and mass of the mirror/magnetic support member, the faster it can be accelerated in any direction to a new position. This fast movement is especially useful in devices such as 3-D televisions, laser light shows, and in data acquisition where a surface is used for sending or receiving data as, for example, acoustical scanning, radar and in other time difference send/receive techniques. The stronger the magnet in the magnetic support member, the heavier the load it will carry when levitated. Suitable magnetic materials can include Alnico V, a high magnetic strength alloy of aluminum, nickel, cobalt, copper, and iron with an approximate composition of 8% Al, 14% Ni, 24% Co, 3% Cu, 51% Fe; or a platinum-cobalt alloy with high magnetic strength with an approximate composition of 77% Pt and 23% Co; or Cunico, a magnetic alloy of copper, nickel and cobalt in an approximate composition of 50% Cu, 21% Ni and 29% Co or equivalent magnetic materials. Suitable superconductive materials can include a ceramic that is an oxide of yttrium, barium and copper according to the approximate formula:

$$Y_1Ba_2Cu_3O_7$$

or a ceramic that is an oxide of thallium, barium, calcium, and copper according to the approximate formula:

$$Tl_2Ba_2Ca_2Cu_3O_{10}$$

or Lanthanum barium copper oxide $LaBaCuO_4$ or equivalent superconductive materials.

Ferromagnetic material 16 can, in one embodiment as seen in FIG. 2, be in the form of a ring positioned around magnetic support member 12. Ferromagnetic material 16 can also, in an alternate embodiment, be formed in segments around the magnetic support member(s), as seen in FIG. 4, or can be formed of extensions of the magnetic support member extending beyond the edges of superconductive material 14. It is important that the mirror and the magnetic support member be thin, lightweight and of very low mass so as to be easily and quickly moved to its desired position. In the instant invention there are no torsional forces when the mirror moves to change direction as there would be using a gimbal-like structure.

Figure 6:
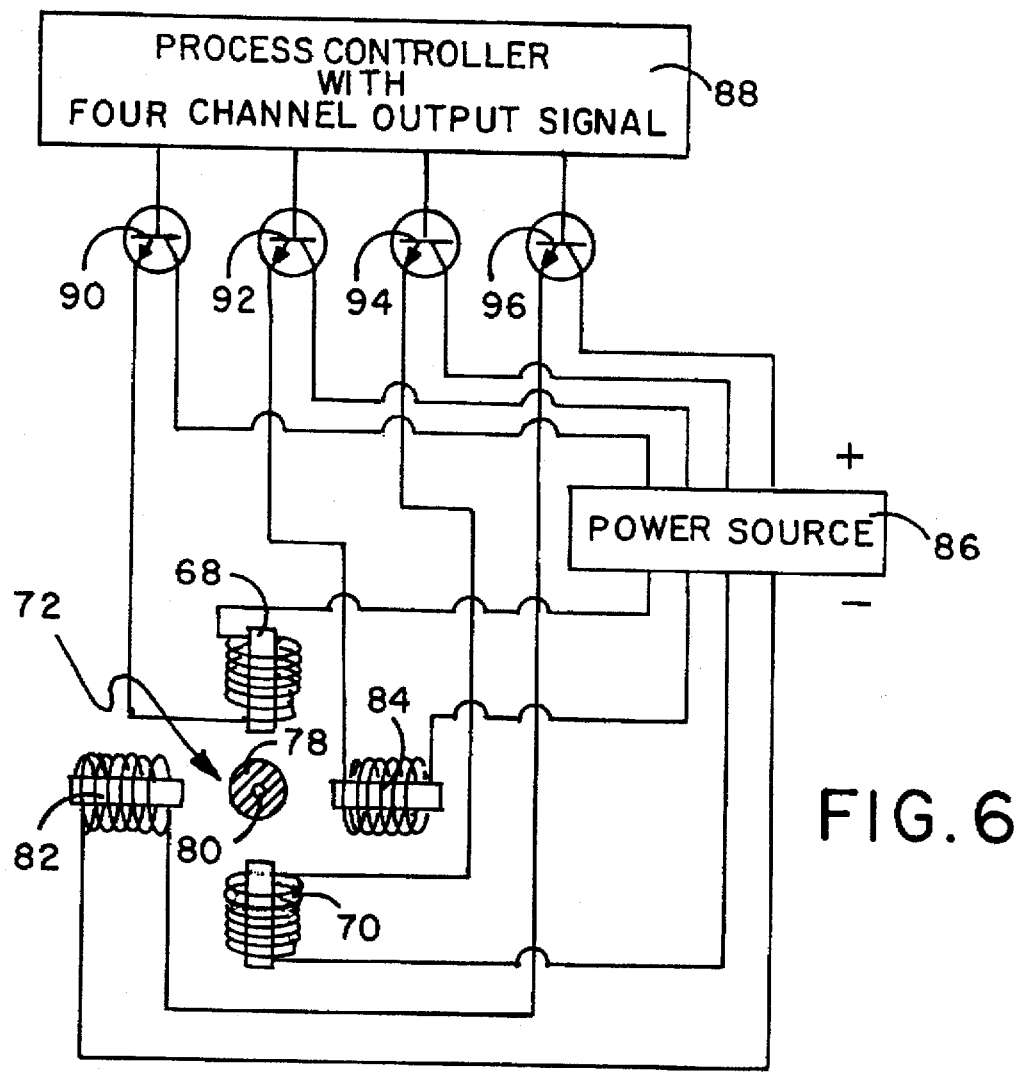
FIG. 6 illustrates a schematic diagram of the beam directional control means.

A plurality of secondary field coils such as coils 20 and 32 can be positioned around and below the periphery of mirror 10 and magnetic support member 12 to induce controlled motion to levitated mirror 10 when current is provided as, for example, through coils 20 and 32 which can be independently activated and which would attract the nearby section of support member 12 or, in an alternate embodiment, ferromagnetic material 16, pulling that side of mirror 10 against the repulsive and laterally stabilizing forces of the superconductor toward the active coil. By controlling which coil is activated and regulating the intensity of the magnetic field of the coil, one can control the direction and amount of movement toward such coil by the mirror. In suspending the mirror by levitation above a superconductive material, there is absolutely no friction relating to the movement of mirror 10 since the entire angular movement of the mirror is controlled by electronically controlled field coils which can direct the movement of the mirror to various positions depending on which secondary field coil(s) is activated. A series of such independently activated field coils can be disposed under the magnetic support member or ferromagnetic ring or equivalent structure embodiment discussed herein to obtain control of the mirror's movement in all directions. Laser 28 is shown reflecting its beam off mirror 10 and the direction of the reflected beam is controlled by the movement of the mirror. Laser 28 can also have its beam moved independently of the movement of the mirror which movement will change the angle of incidence and reflection at an even faster rate than by using the mirror movement alone. In the embodiment shown in FIG. 1 magnetic coils 68 and 70 can attract and move in different directions a ferrous material collar 72 which surrounds an optical fiber or fiber optic bundle 80 to move it to a desired position. The fiber optic extends to an optical system 74 to focus the laser light back into a directed beam. FIG. 6 illustrates a schematic diagram of a control system to direct the movement of the laser beam, such diagram showing ferrous material collar 72 having an outer magnetically attractive portion 78 with fiber optic 80 passing therethrough. When, for example, any of coils 68, 70, 82 and 84 is activated by controller 88 to have current running therethrough from power source 86, such coil will pull collar 72 toward it by sequencing the activation of coils 68, 70, 82 and 84 by process controller 88 through transistor switches 90, 92, 94 or 96. It is advantageous to move beam 76 independently of the movement of the mirror as such movement can increase the speed at which the scanning of the beam can occur.

Figure 7:
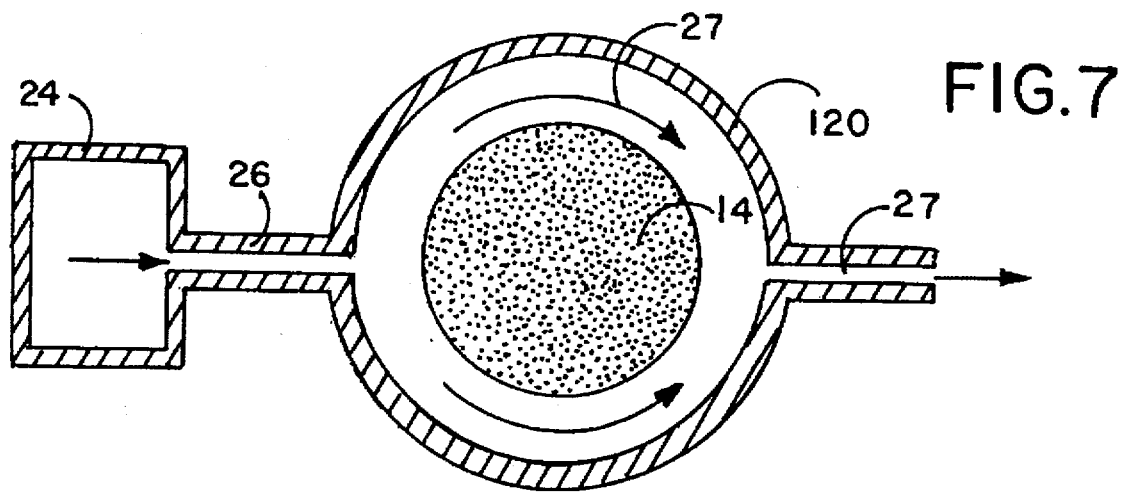
FIG. 7 illustrates a cross-sectional view through A—A of FIG. 1.

Superconductive material 14 can have liquid nitrogen flowing therethrough emanating from source 24 through channel 26 so as to make it superconductive. FIG. 7 illustrates a top cross-section view through section A—A of FIG. 1 which shows the flow 27 of the cooling fluid through chamber 120 around super conductive material 14 and out outlet 27. Because of advances in the field of superconductive materials which advances allow for an increase in the temperature required to cause a superconductive reaction in materials, it is envisioned that the mirror of this invention will be supported above a superconductive material at some point in the future where the superconductive material will not require such extensive cooling in order to make it superconductive.

In FIG. 2 beam 30, such as from a laser, which beam can also be any specularly reflected beam in the electromagnetic spectrum, such as infrared, visible and ultraviolet beams, is shown emitted at an angle to the plane of mirror 32 which can be mounted, for example, at an angle to magnetic support member 12.

The mirror used can be made of a polished reflective material, for example, silver, gold, chrome, aluminum, aluminum oxide or equivalent. The mirror can also be made having reflective coatings of these materials on glass, plastic, crystal or equivalent materials. Certain reflective materials or coatings are better reflectors for certain light frequencies than for others.

FIG. 3 illustrates mirrors 40 and 41 being positioned on the visible faces of pentagon 44 with other mirrors on two non-illustrated faces from which beams can be reflected from the various sides with pentagon 44 moving quickly to direct those beams to various positions as would be needed. Other differently shaped mirrors and mirror supports can also be used.

The secondary field coils, such as field coils 20 and 32 seen in FIG. 1, can each be independently controlled through a series of electronic circuits which are not illustrated, but the sequence and operation of these circuits would depend on the needs of the device in which the moving mirror is positioned. More field coils and/or a plurality of ferromagnetic segments or magnetic support member extensions or equivalent structure can be provided around the mirror for further directional control of the mirror's movement. In one embodiment of the invention not contained within a vacuum chamber a controlled stream of air, not shown, directed at the levitated magnetic material can also help position the mirror. The electronic circuitry would provide the voltage for secondary field coils 20 and 32 to direct the mirror to a desired position so that the beam, such as from laser source 28, or other beam source hits the object desired to be struck by the reflected beam depending upon which type of system utilizes the movable mirror of this invention. The movement of mirror 10 once in its levitated position above superconductive material 14 is affected by the specific attraction of a coil, such as field coil 32, when biased on, creating a magnetic field pulling that edge of the levitated mirror nearest the coil, opposing the repelling force of the superconductive material. Since the superconductor can reflect other magnetic fields, the positioning of the coils must be accomplished so as not to have their magnetic fields adversely affected by the superconductor or vice versa.

Mirror 10 will return to its original levitated position above superconductive material 14 when the activated coil has been biased off by the force of the repulsion of the superconductor's interaction with the magnetic field of the magnetic support member. By operating the coils in sequence by electronic controls, the mirror can be moved virtually instantaneously and frictonlessly to a variety of positions from any position to direct any beam reflected by the mirror.

Figure 5:
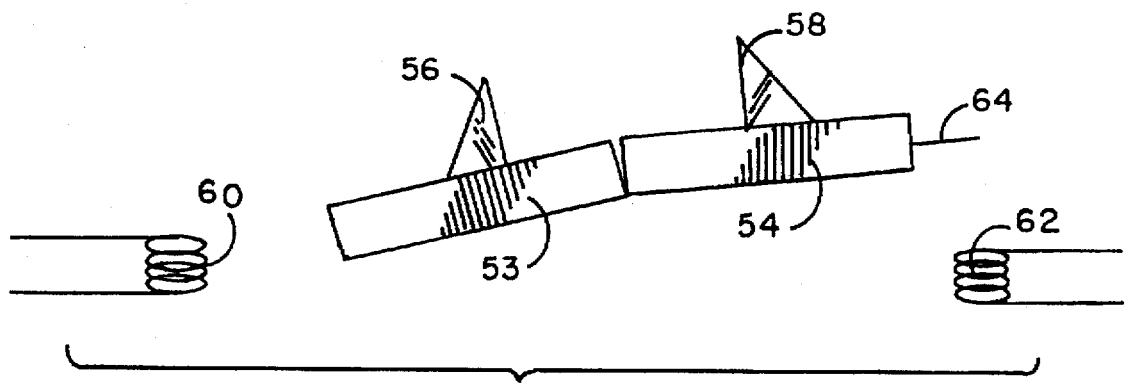
FIG. 5 illustrates a side view of two interattracted magnetic support members showing one at an angle to the plane of the other.

Multiple interattracted levitated magnetic support members 50, 51, 52, 53 and 54 seen in FIG. 4 and partially in side view in FIG. 5 are releasably joined together by mutual magnetic attraction, each such magnetic support member having a ferromagnetic segment such as 64 and an individual mirror configuration thereon such as mirror configurations 56 and 58 in FIG. 5 with each having its own independent field coil, such as field coils 60 and 62, respectively. Multiple interattracted magnetic support members can yield a wide variety of configurations for different mirror positioning and movement.

Although the present invention has been described with reference to particular embodiments, it will be apparent to those skilled in the art that variations and modifications can be substituted therefor without departing from the principles and spirit of the invention.

I claim:

1. A moving mirror apparatus to direct the scanning of a beam of light, comprising:

a lightweight support member of magnetic material and low mass disposed in a first plane, said support member able to be repulsed by a superconductive material, said support member having an outer periphery, a top mirror and a bottom, said support member able to be moved to a variety of angular positions relative to said first plane, said mirror surface receiving said light beam thereon and reflecting same to a first position;

a superconductive material;

means to levitate said support member to float over said superconductive material at a first axis in said first plane;

a plurality of field coils positioned around and below the outer periphery of said support member; and means to activate selected of said field coils at a desired sequence and intensity to attract said support member sufficient to overcome the repulsive force of said levitation means to change be position of said floating mirror surface to another plane by rotating about an axis in said first plane and direct said beam of light to a selected other position.

2. The apparatus of claim 1 further including means to move said beam of light independently of the movement of said mirror.

3. A moving mirror apparatus to direct the scanning of a beam of light, comprising:

a lightweight support member of magnetic material and low mass disposed in a first plane, said support member able to be repulsed by a superconductive material, said support member having an outer periphery, a top and a bottom, said support member able to be moved to a variety of angular positions relative to said first plane;

a lightweight mirror of low mass mounted on the top of said support member, said mirror receiving said light beam thereon and reflecting same to a first position;

a superconductive material;

means to levitate said mirror mounted on said support member to float over said superconductive material at a first axis in said first plane;

a plurality of field coils positioned around and below the outer periphery of said support member; and means to activate selected of said field coils at a desired sequence and intensity to attract said support member sufficient to overcome the repulsive force of said levitation means to change the position of said floating mirror to another plane by rotating about an axis in said first plane and direct said beam of light to a selected other position.

4. The apparatus of claim 3 further including means to move said beam of light independently of the movement of said mirror.

5. A moving mirror apparatus to direct the scanning of a beam of light, comprising:

a lightweight support member of magnetic material and low mass disposed in a first plane, said support member able to be repulsed by a superconductive material, said support member having an outer periphery, a top and a bottom, said support member able to be moved to a variety of angular positions relative to said first plane;

a lightweight mirror of low mass mounted on the top of said support member, said mirror receiving said light beam thereon and reflecting same to a first position;

ferromagnetic material of low mass positioned at the outer periphery of said support member;

a superconductive material;

means to levitate said mirror mounted on said support member to float over said superconductive material at a first axis in said first plane;

a plurality of field coils positioned around and below the outer periphery of said support member; and means to activate selected of said field coiled at a desired sequence and intensity to attract said ferromagnetic material sufficient to overcome the repulsive force of said levitation means to change the position of said floating mirror to another plane by rotating about an axis in said first plane and direct said beam of light to a selected other position.

6. The apparatus of claim 5 wherein said ferromagnetic material forms an extension of said support member beyond said superconductive material.

7. The apparatus of claim 5 wherein said ferromagnetic material forms a ring around said support member.

8. The apparatus of claim 5 wherein said mirror is formed on the top of said support member.

9. The apparatus of claim 5 wherein said mirror is mounted at an angle to said support member.

10. The apparatus of claim 9 further including a plurality of support members, each support member having a mirror associated therewith.

11. The apparatus of claim 10 further including a plurality of support members magnetically interattracted to one another, each carrying a mirror.

12. The apparatus of claim 5 further including means to move said beam of light independently of the movement of said mirror.

* * * * *